J. B. & L. C. CLARK.
MACHINE FOR MAKING NUTS.
No. 301,433. Patented July 1, 1884.
6 Sheets—Sheet 1.
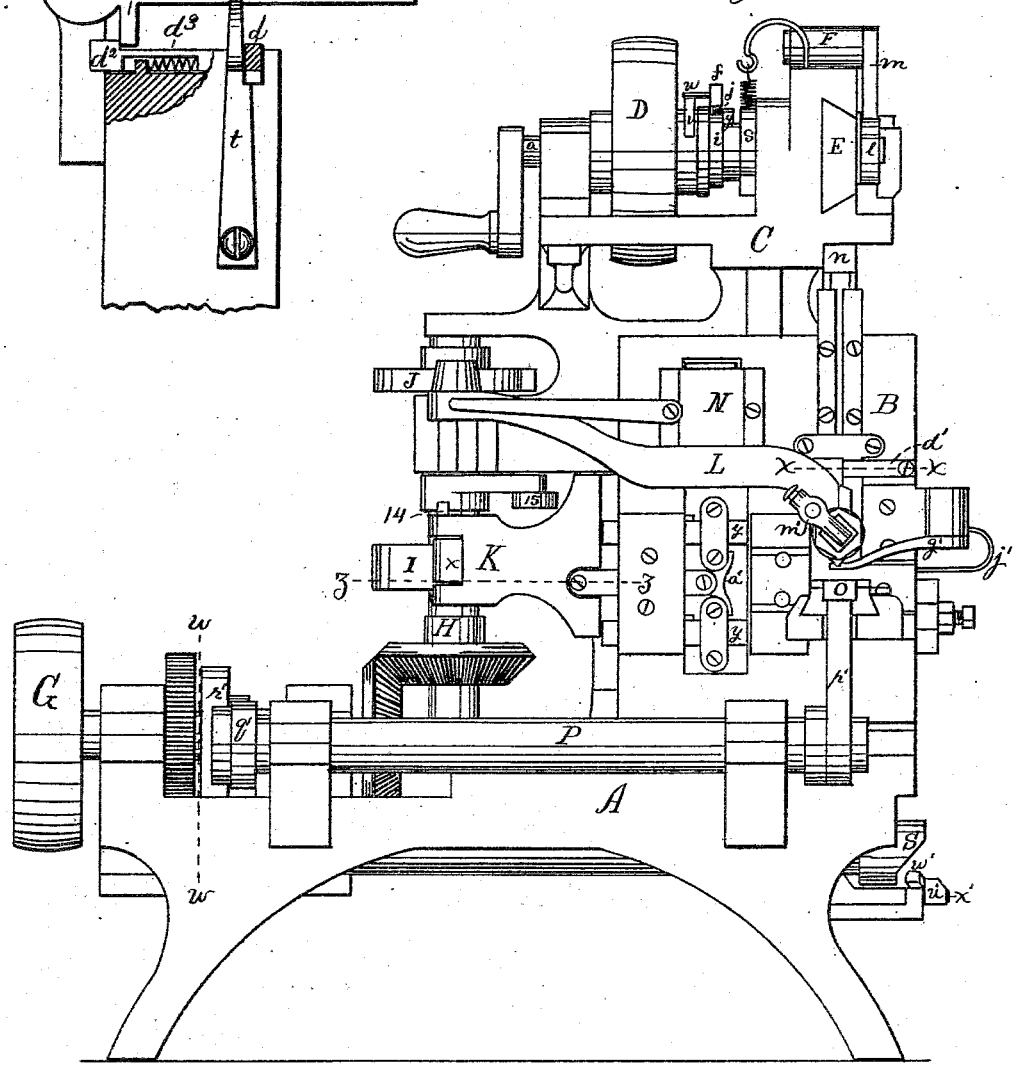
Witnesses.
Geo. A. Gowdy
Henry A. Mitchell
Inventors.
James B. Clark
Lucas C. Clark
By James Shepard Atty.

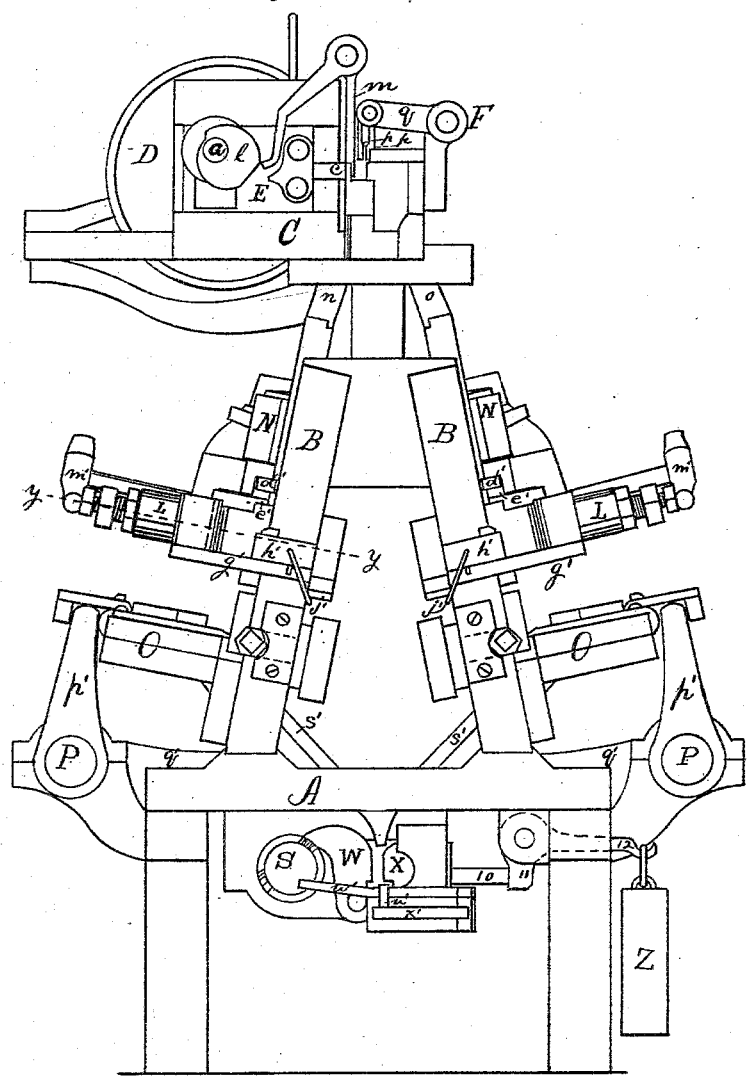

J. B. & L. C. CLARK.
MACHINE FOR MAKING NUTS.
No. 301,433. Patented July 1, 1884.
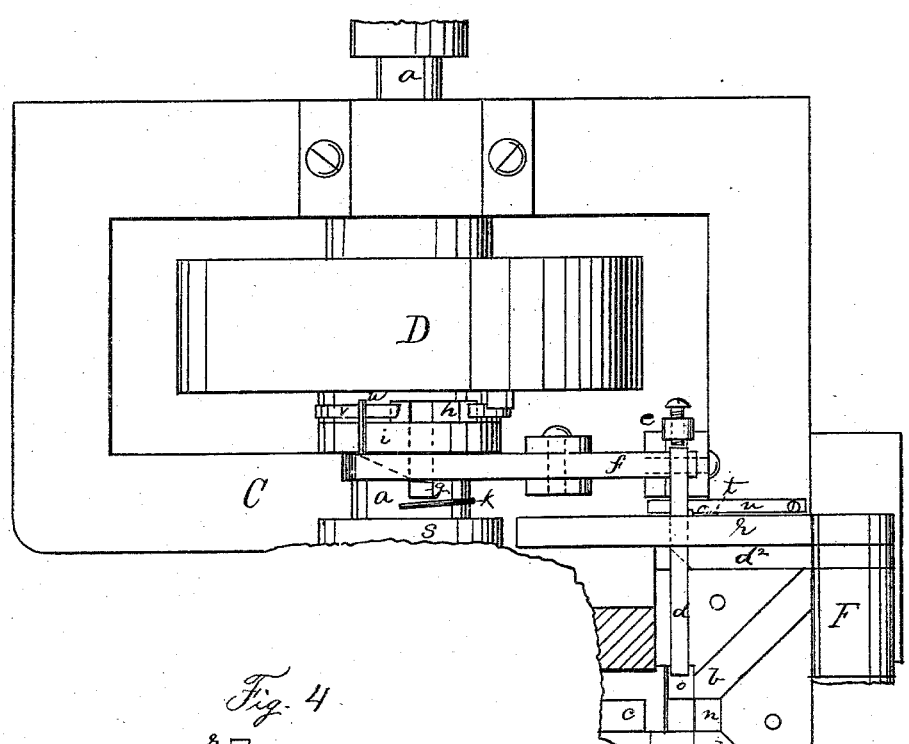
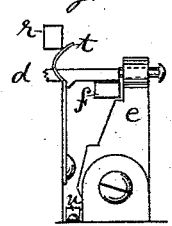

J. B. & L. C. CLARK.
MACHINE FOR MAKING NUTS.
No. 301,433. Patented July 1, 1884.
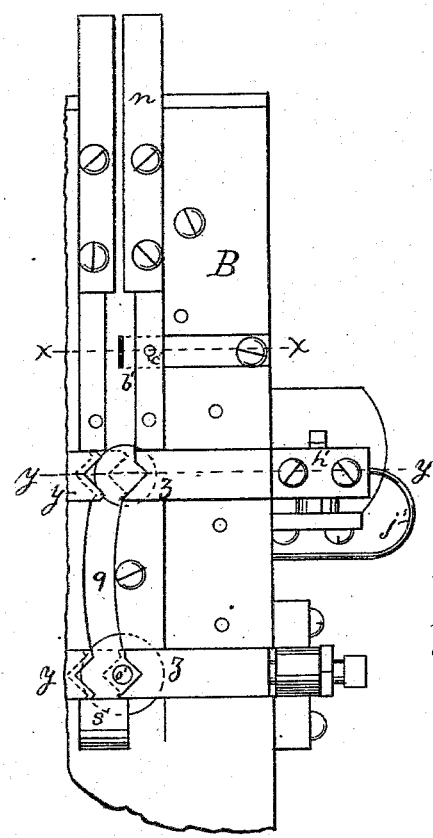
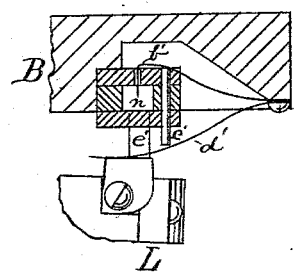
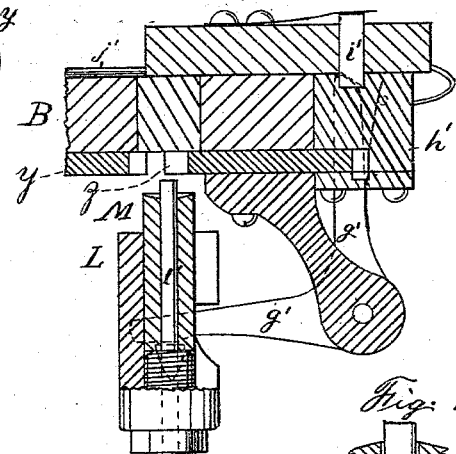
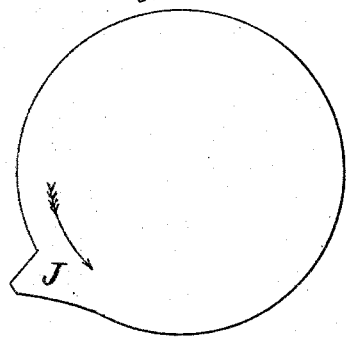
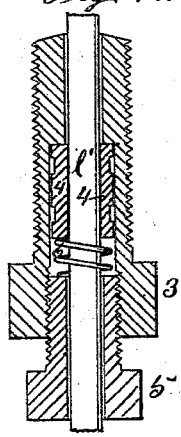
Witnesses
Geo. A. Gowdy
Henry A. Mitchell
Inventors.
James B. Clark
Lucas C. Clark.
By James Shepard Atty.

J. B. & L. C. CLARK.
MACHINE FOR MAKING NUTS.
No. 301,433. Patented July 1, 1884.
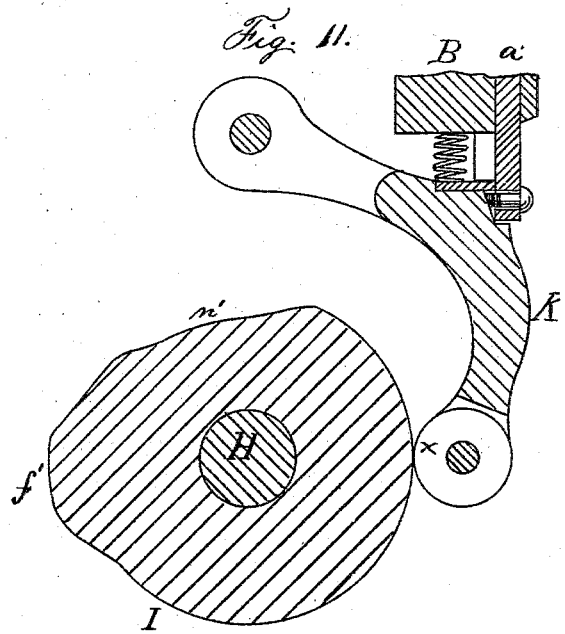
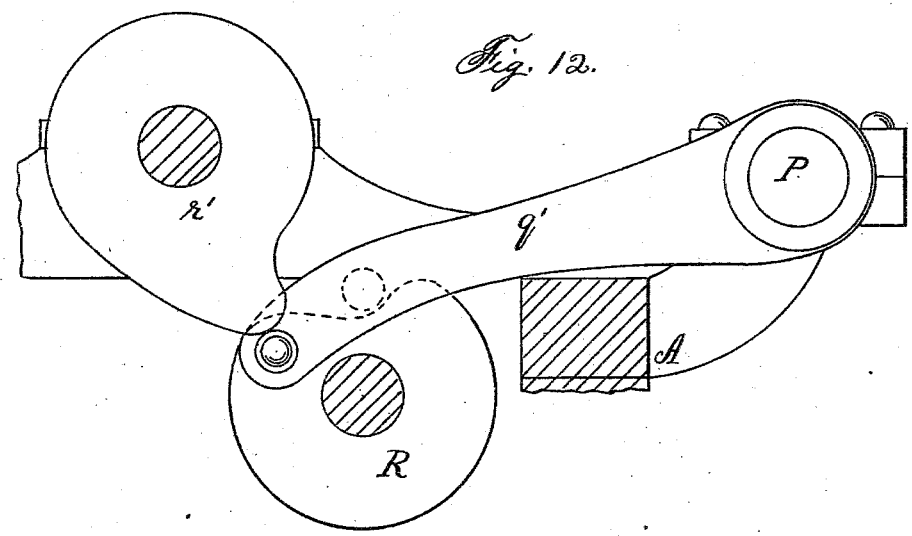

6 Sheets—Sheet 6.

J. B. & L. C. CLARK.
MACHINE FOR MAKING NUTS.

No. 301,433. Patented July 1, 1884.

Witnesses.
Geo. A. Goody
Henry A. Mitchell

Inventors
James B. Clark.
Lucas C. Clark.
By James Shepard Atty.

UNITED STATES PATENT OFFICE.

JAMES B. CLARK AND LUCAS C. CLARK, OF PLANTSVILLE, CONNECTICUT; SALMON C. CLARK ADMINISTRATOR OF SAID JAMES B. CLARK, DECEASED, AND SAID L. C. CLARK ASSIGNOR TO SALMON C. CLARK, ADMINISTRATOR OF JAMES B. CLARK, DECEASED, OF SAME PLACE.

MACHINE FOR MAKING NUTS.

SPECIFICATION forming part of Letters Patent No. 301,433, dated July 1, 1884.

Application filed March 20, 1875.

*To all whom it may concern:*

Be it known that we, JAMES B. CLARK and LUCAS C. CLARK, both of Plantsville, in the county of Hartford and State of Connecticut, have invented certain new and useful Improvements in Machines for Making Hot-Pressed Nuts, of which the following is a specification.

In our machine for making nuts the mechanism for cutting off is driven by an independent belt, and is located at the top, or above the part of the machine which finishes the nut. It is set in motion by the action of the bar of iron when placed in the machine, which bar has a nut-blank cut out of it at such a distance from its end that the portion beyond that cut out answers as a blank for one nut, one piece falling into a slide or hopper at one side of the machine, and the other into a similar hopper upon the other side. The mechanism for squaring, cupping, and punching is driven by a belt independent from that which drives the cutting-off mechanism. The nut-blank falls into the first pair of dies or hammers by its own gravity, said dies bringing it central in front of the cupping-die, which then comes forward to cup it, after which the dies open so far as to allow it to drop, when it falls through a groove into a second pair of dies, which compress it cornerwise, but upon the two corners which were during the operation of the first dies at the meeting line of said dies. When in the second pair of dies, it is punched, after which it passes to another pair of dies or jaws, which compress it flatwise and give it the finishing touch.

Our invention consists of the peculiar construction, arrangement, and combination of devices for operation as above described, and as hereinafter more fully set forth.

Figure 13:
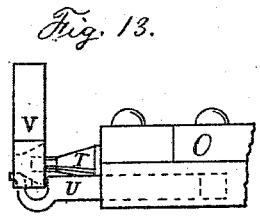
Figure 14:
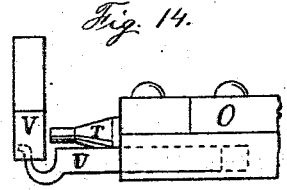
Figure 15:
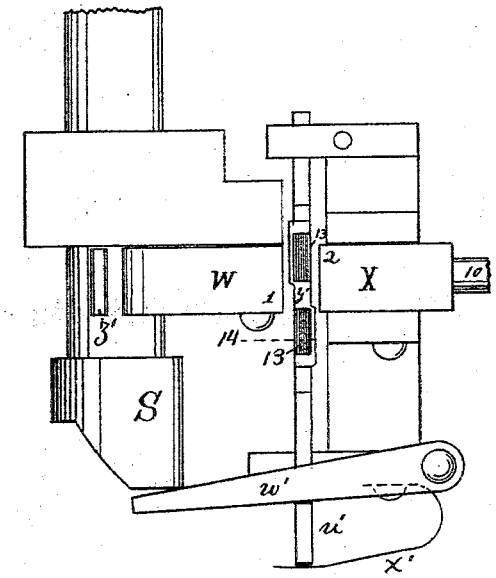
Figure 16:
Figure 17:
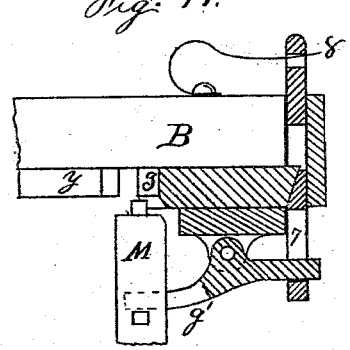

In the accompanying drawings, Figure 1 is a front elevation of a machine for making nuts which embodies our invention. Fig. 2 is a side elevation of the same. Fig. 3 is a plan view of a portion of said machine when other portions are removed. Fig. 4 is a side elevation of a detached portion thereof. Fig. 5 is a front elevation of the dies belonging to our said machine, the same being shown with portions removed, in order to better show the remaining parts. Fig. 6 is a sectional view of the hopper belonging to said machine, the same being taken on line $x\ x$ of Figs. 1 and 5. Fig. 7 is a sectional view showing the upper pair of dies, the same being taken on line $y\ y$ of Figs. 2 and 5. Fig. 8 is a plan view of one of the cams. Fig. 9 is a plan view of one of the springs. Fig. 10 is an enlarged sectional view of parts belonging to the friction-holder which operates in connection with the cupping-die. Fig. 11 is a sectional view of the mechanism which operates the dies, the same being taken on line $z\ z$ of Fig. 1. Fig. 12 is a vertical sectional view of the mechanism which drives the punching apparatus, the same being taken on line $w\ w$ of Fig. 1. Fig. 13 is a side elevation of the punch and take-off. Fig. 14 is a side elevation of the same parts, taken in different position. Fig. 15 is a top view of detached portions, showing the flatting-dies. Fig. 16 is a vertical section of a sliding bar belonging to said dies, and taken on the line 14 of Fig. 15. Fig. 17 is a modification of the mechanism shown in Fig. 7 for releasing the anvil-die, and Fig. 18 is a side elevation of parts of the blanking-out mechanism.

A designates the lower frame of the machine; B B, the vertically-inclined beds, and C the frame of the cutting-off portion of the machine. The two vertically-inclined beds are arranged one upon each side of the machine, as shown in Fig. 2. Upon each of these beds there is a set of mechanisms for squaring, cupping, and punching the nuts, which mechanisms are duplicates of each other, and therefore it is deemed necessary to fully show only one set thereof.

Immediately above the beds B B is the cutting-off or blanking mechanism, in which D designates the driving-pulley, which is free to turn upon its shaft $a$ without revolving it. A bar of iron is selected of a width and thickness equal to that desired for the nut-blank, and, after bringing it to a proper heat, it is placed between the cut-off dies $b\ b$ and the punch $c$, (see Fig. 3,) until stopped by contact with the side wall at the end of the recess between the dies and punch. Before reaching said side wall the end of the bar strikes the end of a slide, $d$, and moves it endwise, when its opposite end strikes the catch $e$, Figs. 3 and 4, and removes it out from under the clutch-lever $f$, which allows that end of it to fall.

Transversely to the slide $d$ there is another slide, $d^2$, operated one way by a spring, $d^3$, Fig. 18, so that the beveled end of said slide bears against a correspondingly-beveled shoulder upon the lower part of the slide $d$, (indicated by broken lines in Fig. 3,) and keeps it pressed against the end of the bar being cut.

Upon the under side of the lever $r$, having its bearing at F, Fig. 3, there extends downward an arm, $d^4$, Fig. 18, which engages with a shoulder upon the end of the transverse slide $d^2$, and just after the punch $c$ and dies $b\ b$ operate to cut blanks from the bar the cam $s$ strikes the lever $r$ and depresses it, when the short arm of said lever withdraws the slide $d^2$ from contact with the slide $d$, so that the pressure of the spring which operates the slide $d^2$ is temporarily removed, when the slide $d$ ceases to press against the blank, and thereby it is released, so as to readily fall down the hopper $o$. We also provide the spring $t$ with a curved upper end, Fig. 4, which bears against the lever $r$. A portion of said spring $t$ is in front of a shoulder formed on the slide $d$, so that when the lever $r$ is depressed and bears upon the curve of the spring $t$ and pushes out the spring the slide $d$ is drawn away from the blank just cut off, by means of the spring $t$ engaging with the shoulder on said slide, before described. The shaft $a$ has a longitudinal slot near the hub of the driving-wheel D, in which slot the clutch-pin $g$ slides, and the hub of the wheel D has a recess, $h$, Fig. 3, at one edge, with which the end of the clutch-pin $g$ engages when released, as hereinafter described. Upon the shaft $a$ there is a collar, $i$, which holds the clutch-pin from falling out of its slot, and upon one portion of which the shoe $j$ of the clutch-lever $f$ rests. This shoe has a wedge-shaped nose, as is indicated by broken lines in Fig. 3, and by the shaded portion of it in Fig. 1. The end of clutch-pin most remote from the hub has a projecting shoulder which projects above that portion of the collar upon which the shoe of the clutch-lever $f$ rests. When the parts are in the position shown in Fig. 3, this shoulder rests upon the side of the shoe $j$, and holds the clutch-pin from engaging with the hub of the wheel D; but when the catch $e$ is removed from under the rear end of the clutch-lever $f$, so as to allow that end of it to fall, as before described, the shoe end of it raises and releases the clutch-pin $g$, when the spring $k$, Fig. 3, throws it into gear with the hub of the driving-wheel D, so that the shaft $a$ revolves with said wheel.

Upon the end of the shaft $a$ there is a cam, $l$, which causes the gripping-levers $m$ to turn upon their fulcrum and move up against the bar and hold it firmly in place, the cam $l$ being so shaped that after the levers grip the bar the cam holds them in that position until the bar is cut off. The eccentric of the shaft $a$ moves the carriage E in its ways, and carries the punch $c$ with it until it (the punch) passes between or into the dies $b\ b$ and punches out a blank from said bar, leaving it directly over the hopper $n$, (see Fig. 3,) when the severed end of the bar beyond that cut out is directly over the hopper $o$, said end being of a proper size for a nut-blank, so that a nut-blank falls into each of the hoppers $n\ o$. We form the dies $b\ b$ of two bars of steel, the ends of which are pointed and meet at an angle of ninety degrees, the sides of said angular or pointed ends being at an angle of forty-five degrees to the sides of the bars. These dies rest in grooves which are also at an angle of ninety degrees to each other, so that the two ends form a die with parallel sides, the width of which die may be varied to accommodate punches of different widths, or after grinding the dies to readjust them to the same punch by means of suitable adjusting-screws arranged to bear against the rear end of the steel bars which form a die, $b\ b$. In order to better show these dies, the cap which covers them and helps to secure them in place is represented as removed. It sometimes happens that a little burr is raised in the act of cutting off, or for some other reason the nut-blanks may be accidentally clogged at the mouth of the hoppers $n\ o$. To prevent such clogging of the hoppers we provide two pushers, $p\ p$, Fig. 2. These are hung upon a lever, $q$, Fig. 2, attached to a shaft having its bearing at F, and to the same shaft another lever, $r$, Fig. 3, is secured, said lever engaging with a cam, $s$, upon the shaft $a$ at such time as to depress said lever $r$, and consequently the lever $q$ and the pushers $p\ p$, just after the punch has cut off the bar, the pushers descending far enough to start the nut-blanks down their respective hoppers. Simultaneously with the operation of the pushers $p\ p$, the slide $d$ releases its hold upon the nut-blank, as before described. The bar is then pushed along for another operation of the cutting-off mechanism, and so on until so much of the bar as is of a proper heat is cut up. The spring $u$ brings the catch $e$ to its normal position, the slide $d$ being brought back by the spring $d^3$, Fig. 18, which acts upon the slide $d^2$, and the clutch-lever $f$ regains its position by the force of gravity, when the shoe $j$ rests upon the collar $i$, and when the clutch-pin comes round to the shoe its tapering nose engages with the projecting shoulder of the clutch-pin and withdraws it from the hub of the wheel D. The spring $v$ upon the hub of the wheel D engages with the pin $w$ upon the shoe end of the clutch-lever and raises the shoe, so as to disengage it from the clutch-pin so soon as the catch $e$ is removed from under the rear end of the clutch-lever, as before described. The hoppers being loaded, motion is imparted to the main driving-wheel G, which is connected by bevel-gear to the upright shaft H, which carries the cams I and J. The cam I bears against a friction-roller, $x$, having its bearing on the swinging frame K, which bears against the ends of two slides, $y\,y$, the opposite ends of which are either formed into or provided with dies or hammers which form one-half of a square, and of a proper form for compressing two sides of a nut, the hammer-dies $y\,y$ being placed opposite similar hammer-dies, $z\,z$, Fig. 5, which will compress the other two sides of the nut. The two slides or hammer-dies $y\,y$ are connected together by means of a proper connection, $a'$, Fig. 1, which is attached to the front of the swinging frame K by a screw or pin, so that the swinging of the frame causes the slides to move back and forth, thereby opening and closing the dies $y\,y\,z\,z$.

Within the respective hoppers there is a spring-catch, $b'$, Figs. 5 and 6. The upper corner of said spring-catch is rounded off, so that it will not accidentally catch and hold a nut-blank. Running through the side of the hopper there is a sliding pin, $c'$, Figs. 5 and 6, one end of which bears against the body of the spring-catch $b'$, and the other end against a spring, $d'$. A lever, L, one end of which carries the cupping-die M, Fig. 7, and the other end is provided with a friction-roller which bears against the cam J, is hung upon the front of the machine and has its fulcrum at N, Fig. 1. The cam J, operating upon said lever L, causes it to swing upon its fulcrum, when the end which carries the cupping-die moves toward the upper pair of hammer-dies $y\,z$, and the lever, or a suitable arm upon said lever, bears against the spring $d'$, which, through the medium of the sliding pin $c'$, throws the spring-catch $b'$ back, so as to allow a nut-blank to pass by it or in front of it, when it is caught by a thin stop, $e'$, upon the end of the lever L, by the forward movement of said lever, which is projected into the hopper through a slot just below the spring-catch, as indicated by broken lines in Fig. 6. The return of the lever L withdraws the stop $e'$, when the spring-catch $b'$ bears against the back of the nut-blank that was stopped by said stop, and holds it firmly in place. Upon another movement of the lever L the spring-catch $b'$ releases its hold upon the nut-blank, and before the stop $e'$ is projected inside the hopper the blank falls down to the upper pair of dies; but when the succeeding blank comes down the hopper the stop $e'$ has projected sufficiently to stop the nut-blank in front of the spring-catch $b'$, so that upon the withdrawal of the stop the spring-catch retains the blank, as before described. At the time that the nut-blank is released so as to fall down the hopper to the dies, the swinging frame K is against the concentric portion of the cam, as shown in Fig. 11, in which position the cam holds the slides and dies $y\,y$ partially forward, as shown in Fig. 5. Here it may be observed that the lower half of the die $y$, or, in other words, the lower left-hand quarter of the die, is longer than the upper half, whereby the nut-blank may, when the dies are in the position shown, readily fall into the dies, but not through them. When the nose $f'$, Fig. 11, of the cam I operates the slides or hammer-dies $y\,y$, they are thrown so far inward as to close the dies $y\,z$, as indicated by broken lines in Fig. 5, and thereby the nut-blank is brought central in front of the coupling-die M, and also the blank is partially compressed edgewise, or at least a small portion of it, upon two opposite corners. Just after this operation of the dies the cam J operates the lever L, whereby the cupping-die M, Fig. 7, is forced upon the flat side of the nut-blank to "cup" it—that is, to impart to it a rounding form upon one side.

Through the die M is a friction-rod, $l'$, Fig. 7, fitted so that it may slide therein by pressure. In Fig. 10 means for imparting friction to said rod are shown, and in which 3 designates a hollow screw, which screw is also shown just back of the cupping-die M, Fig. 7. At one end of the screw 3 there is a chamber, within which are the friction-jaws 4 4. Said jaws are forced firmly against the rod $l'$ by means of one or more springs, an edge view of which is shown in Fig. 9. The jaws 4 4 are held within the chamber by a screw, 5, of such length that there is a little space between the ends of the jaws 4 4 and the screw 5, and within which space is a spiral spring, 6, which should be of such strength that the friction of the jaws 4 4 on the rod $l'$ will overcome the power of said spring, so that depressing the front end of the rod will carry the jaws with it and depress the spiral spring, and when the pressure is removed from the rod $l'$ the spring 6 will cause it to resume its former position. A stop, $m'$, permanently fixed in place by means of a rod or arm which extends from the bed B, Figs. 1 and 2, is directly in front of the end of the rod $l'$. (See Fig. 7.) When the hammer-dies or slides begin to recede and the cupping-die M advances, the end of the rod $l'$ strikes the nut-blank and holds it in place while the dies withdraw, and as the cupping-die moves on toward the nut-blank the spring 6 first yields until forced home, after which the friction-jaws slide on the rod $l'$ until the cupping-die has completed its work, or until the face of said die is even with the end of the rod $l'$, and when the cupping-die M returns the outer end of the rod $l'$ strikes the stop $m'$, and as the die moves on farther it slides over the rod, so that said rod again projects at the face of the die M, as shown in Fig. 7. At the right of the upper dies there is an arm extending from the bed B, upon which arm is hung the two-armed lever $g'$. The upper one of the dies $z\,z$ is attached to a sliding block, $h'$, which is held firmly in place by a slide, $i'$, Fig. 7, so that when the nut-blank is compressed edgewise within the dies this part of the die is immovable; but as the dies begin to open and the cupping-die M approaches the nut-blank a projection upon the under side of the lever L (indicated by broken lines in Fig. 7) engages with one arm of the lever $g'$, which causes the beveled end of its opposite arm (as also indicated by broken lines in Fig. 7) to strike against the end of the slide $i'$, (the lower corner of which is also beveled or inclined,) and throws it endwise, so as to disengage it from the sliding block $h'$. This arm of the lever $g'$ then engages with the pin upon the under side of said block (said pin being indicated by a broken circle) and draws it and the die $z$ out of the way of the cupping-die, which then comes forward to finish its work. Suitable springs carry the parts back to their former position, except the sliding block $h'$, which is brought back by the rod $j'$, which is attached at the rear of the slides $y\ y$ to a pin or arm which moves with them. A modification of this mechanism is shown in Fig. 17. The dies $z$ and cupping-die M are the same as before described, and a similar two-armed lever, $g'$, but of a different form, is employed. The end of the die $z$ is beveled or inclined, and a slide, 7, moving transversely to the die $z$, is secured upon the side of the frame or bed B, said slide being provided with a corresponding wedge or incline, as shown in the drawings. When in the position shown, the inclines are so abrupt that the die $z$ is held immovable; but when the cupping-die M advances a projection on it engages one arm of the lever $g'$, when the opposite arm of said lever draws the slide 7 forward, thus removing its wedge portion from opposite the end of the die, so that when the beveled corner of the die M strikes a correspondingly-beveled corner on the die $z$ (shown in Fig. 17) the die $z$ is free to slide out of the way of the cupping-die. A spring, 8, brings the slide 7 and lever $g'$ to their original position upon the return of the die M. Just after the nose $f'$ of the cam I has passed the friction-roller of the swinging frame K, said roller drops into the recess or short arm $n'$ of the cam I, which causes the dies to open just far enough, as indicated by broken lines in Fig. 5, to allow the nut to drop out of the dies. Between the dies there is a groove, 9, slightly curved, as shown in Fig. 5, and as the nut drops out of the dies it falls through said groove and into the lower dies, said dies being started in just enough to prevent the nut from falling through them, as before described for the first pair. Simultaneous with the passage of the nut from the upper to the lower dies another blank falls into the upper dies. When the nut-blank leaves the upper dies, by reason of making one arm of the V longer than the other, as shown in Fig. 5, the blank moves out from said dies cornerwise and to the left, after which it descends through the groove 9, Fig. 5, and so soon as its sides—that is, two of its sides—are brought to a vertical position within said groove it has made one-eighth of a revolution. When the blank reaches the second die, its lower right-hand corner strikes on the lower right-hand arm of the V-shaped die $z$, and then turns over toward the left, and so soon as the dies $y\ z$ have closed upon it it has made another one-eighth of a revolution, turning in all a quarter-turn, so that the corners which were when the nut was hammered or centered in the upper die at the seam of the die, and consequently not compressed, are now at the solid bottom of the V, so that after being struck in both dies all the four corners of the nut are properly compressed or hammered. We call the beds B B "vertically-inclined beds," by which we mean that they are inclined to one side, but are preferably nearer a vertical than they are a horizontal position, as shown in Fig. 2. The office of the incline of these beds B B is to cause the nut-blanks to readily descend of their own weight, and at the same time their weight will cause them to hug the bed and prevent them from falling forward out of the groove 9 upon their passage downward. About the same time that the lower dies are compressing the nut, a punch, T, Figs. 13 and 14, secured within the slide O, moves forward and enters the circular and female die $o'$, thereby cutting a hole in the center of the nut. By the side of the punch T there is a friction-slide, U, that performs a similar office to that of the rod $l'$, before described. In Fig. 13 the punch is shown advancing toward the die. The end of the friction-slide U is curved around the take-off V, so that its end can project in front of said take-off to bear against and hold the nut-blank. A slot is cut partially through the take-off V, within which slot the end of the slide plays. In Fig. 14 the punch is represented as receded, and the slide, being caught by its end striking the bottom of the slot in the take-off V, has been pulled out, so that on its return it projects in advance of the punch until it strikes the nut-blank with sufficient force to overcome the friction of the slide within its bearings. This punch-carrying slide O is operated by means of arms $p'$ and $q'$ on on shaft P, the latter arm, $q'$, being operated by cams $r'$ R, the former cam, $r'$, being on the same shaft as the driving-wheel G, and driving the punch forward, while the latter cam causes the punch to return, the shaft carrying said cams being connected by suitable gearing. When the dies again open far enough to let the nut fall out, the nut from the lower dies falls into the hopper $s'$, Figs. 5 and 2, which conveys the nut to the finishing or flatting dies W X, Figs. 2 and 15. Between these dies there is a stop, $y'$, which is moved back and forth between the dies by means of the cam S, lever $w'$, and springs $x'$. The two hoppers both deliver to this pair of flatting-dies; but their ends are offset, and discharge at the points 1 and 2, Fig. 15. The nut-blank, as it falls at the point 1, is stopped by the stop $y'$, when the cam $z'$, Fig. 15, (which cam is on the same shaft as the cam R, Fig. 12,) strikes the hinged or swinging die W, Figs. 2 and 15, and causes it to close or move toward its fellow die X, and smooth the sides of the nut.

Only one cam $z$ is shown; but there is a duplicate of said cam upon the opposite side of the shaft, so that the dies W X are closed twice during each revolution of the shaft carrying the cams $z$, $z'$, S, and R. The part X of the flatting-dies W X is arranged so as to slide to and from the part W, or, in other words, it is yielding. At its back side there is a rod, 10, Figs. 15 and 2, which rod bears against the short arm 11 of lever 12, Fig. 2, and upon the lever 12 there is a weight, Z. When a nut is within the dies W X, if more than the requisite amount of pressure to properly flatten or finish the nut is applied to the said dies, the weight (if of a proper size) allows the die X to yield, so that no greater pressure can be brought to bear upon the nut. By varying the amount of the weight upon the lever 12 a greater or less pressure may be applied to the flatting or smoothing of the nut. When a nut has been flatted at the point 1, the spring $x'$ throws the slide $u'$ and lever $w'$ inward, when the lever rests against the short arm of the cam S, so that the stop $y^2$ is at the point 2, and the nut falls down one of the inclined let-offs 13, Figs. 15 and 16. A nut from the other hopper then falls upon the stop $y'$, and is flatted in the dies W X, after which the cam S brings back the slide $u'$, the nut falls down the other one of the inclined let-offs 13, and the stop is at the point 1, ready to catch another nut as it comes from the hopper $s'$.

We have said that the mechanism for squaring, cupping, and punching are duplicates, by which we mean the mechanisms that are located upon the two beds B B; but there is only one set of the cams $r'$, I, and J, each of which operates a double set of levers or swinging frames.

Although a spring is employed to bring back the swinging frame K, we also provide its end with a projecting pin, 14, Fig. 1, which is caught by a projecting finger, 15, upon the arm which extends from the shaft H, and brings the swinging frame back.

We claim as our invention—

1. The dies $b\ b$, provided with pointed ends and made adjustable within diagonal grooves, and co-operating with the punch $c$, all substantially as described, and for the purpose set forth.

2. The combination of a suitable nut-feeding chute and a pair of V-shaped dies having the lower quarters thereof longer than the upper ones, substantially as described, and for the purpose specified.

3. The hoppers $n\ o$, in combination with the punch $c$ and die $b\ b$, one hopper being located directly in front of the punch, and one upon one side thereof, substantially as shown and described, whereby the piece cut out and the piece cut off are each brought by the action of the punch over their respective hoppers, as set forth.

4. In an organized machine, the slide $d$, with its end projecting over the blanking mechanism, in combination with the clutch mechanism which starts the machine, substantially as described, and for the purpose specified.

5. The slide $d$ and the transverse slide $d^2$, provided with springs to force the slide $d$ up to its work, in combination with cam $s$ and lever $r$, for releasing the slide $d$ at the proper time, substantially as and for the purpose described.

6. The spring-catch $b'$, projecting within the hopper, in combination with the sliding pin $c'$, spring $d'$, and lever L, all substantially as described, and for the purpose set forth.

7. The stop $e'$, in combination with the hopper $n$, lever L, spring-catch $b'$, and their connecting mechanism, substantially as described, and for the purpose set forth.

8. The hammer-dies $y\ z$, with the two lower arms of the V formed longer than the upper one, substantially as described, whereby when the dies are started toward each other a nut-blank may fall into said dies, but not through them, as set forth.

9. The combination of a suitable nut-feeding chute, a pair of V-shaped dies located therein, having the lower quarters thereof longer than the upper ones, and suitable cams for moving one member of said dies and allowing it to stop at three distinct points, substantially as described, and for the purpose specified.

10. The anvil side of the upper die $z$ and the slide $i'$, in combination with the lever $g'$ and the cupping-die M, substantially as described, whereby the lever withdraws the slide $i'$, for the purpose set forth.

11. The upper dies $y\ z$ and their operating mechanism, in combination with the cam J, lever L, and cupping-die M, all substantially as described, and for the purpose set forth.

12. The upper hammer-dies $y\ z$, in combination with the friction-rod $l'$, cupping-die M, and stop $m'$, and suitable actuating mechanism operating substantially as described, and for the purpose set forth.

13. The friction-slide U, in combination with the punch T and its take-off V, substantially as and for the purpose described.

14. In combination, the rod $l'$, jaws 4 4 and their gripping-spring, the spring 6, and screws 3 and 5, all substantially as and for the purpose described.

15. The take-off V, slide U, punch T, and its carriage O, in combination with arm $p'$, shaft P, arm $q'$, and cams $r'$ and R, substantially as and for the purpose described.

16. The slide $u'$, provided with stop $y'$, and inclined let-off 13, in combination with the flatting-dies W X, substantially as and for the purpose described.

17. The flatting-dies W X, slide $u'$, provided with stop $y'$, and inclined let-off 13, in combination with the lever $w'$, spring $x'$, and cams S and $z'$, all substantially as and for the purpose described.

18. In combination with a blanking mechanism, the vertically-inclined hopper $n$, the two sets of hammer-dies $y\ z\ y\ z$, the cupping-die M, the punch T, and their operating mechanism, substantially as described, and for the purposes set forth.

19. The combination of the hopper $n$, the hammer-dies $y\ z\ y\ z$, the cupping-die M, friction-rod $l'$, the punch T, friction-slide U, and their driving mechanism, substantially as and for the purpose described.

20. The cupping-die M, the lever L, and the cam J, in combination with the hammer-dies $y\ z\ y\ z$, their connection $a'$, swinging frame K, and the cam I, all substantially as and for the purpose described.

21. The combination of the cupping-die M, lever L, cam J, hammer-dies $y\ z\ y\ z$, frame K, and cam I, with the cams $r'$ R, arm $q'$, shaft P, arm $p'$, and the punch-carrying slide O, all substantially as described, and for the purpose set forth.

22. The combination of the cupping-die M, lever L, cam J, hammer-dies $y\ z\ y\ z$, frame K, cams I $r'$ R, arm $q'$, shaft P, arm $p'$, and the punch-carrying slide O, with the hopper $s'$, and the flatting-dies W X, all substantially as and for the purpose set forth.

23. The combination of the cam $l$, grippers $m\ m$, punch $c$, die $b\ b$, pushers $p\ p$, lever $r$, cam $s$, slides $d\ d^2$, catch $e$, clutch-lever $f$, pin $g$, driving-wheel D, and shaft $a$, all substantially as described, and for the purpose set forth.

24. The combination of the clutch-lever $f$, shoe $j$, clutch-pin $g$, pin $n$, and spring $v$ upon the hub of the wheel D, all substantially as and for the purpose described.

25. In a machine for making square nuts, the combination of the inclined bed having the channel or groove 9, the two pairs of V-shaped dies $y\ z$ at the upper and lower ends of said groove, respectively, having their V-shaped sides standing obliquely to said groove, and mechanism for operating said dies, substantially as described, and for the purpose specified.

26. The combination of the inclined bed having on its side the groove or channel 9, a pair of V-shaped hammer-dies and cupping mechanism at the upper end of said groove, another pair of V-shaped hammer-dies, and punching mechanism at the lower end of said groove, substantially as described, and for the purpose specified.

JAMES B. CLARK.
LUCAS C. CLARK.

Witnesses:
H. H. CLARK,
W. H. CUMMINGS.